Figure 1:
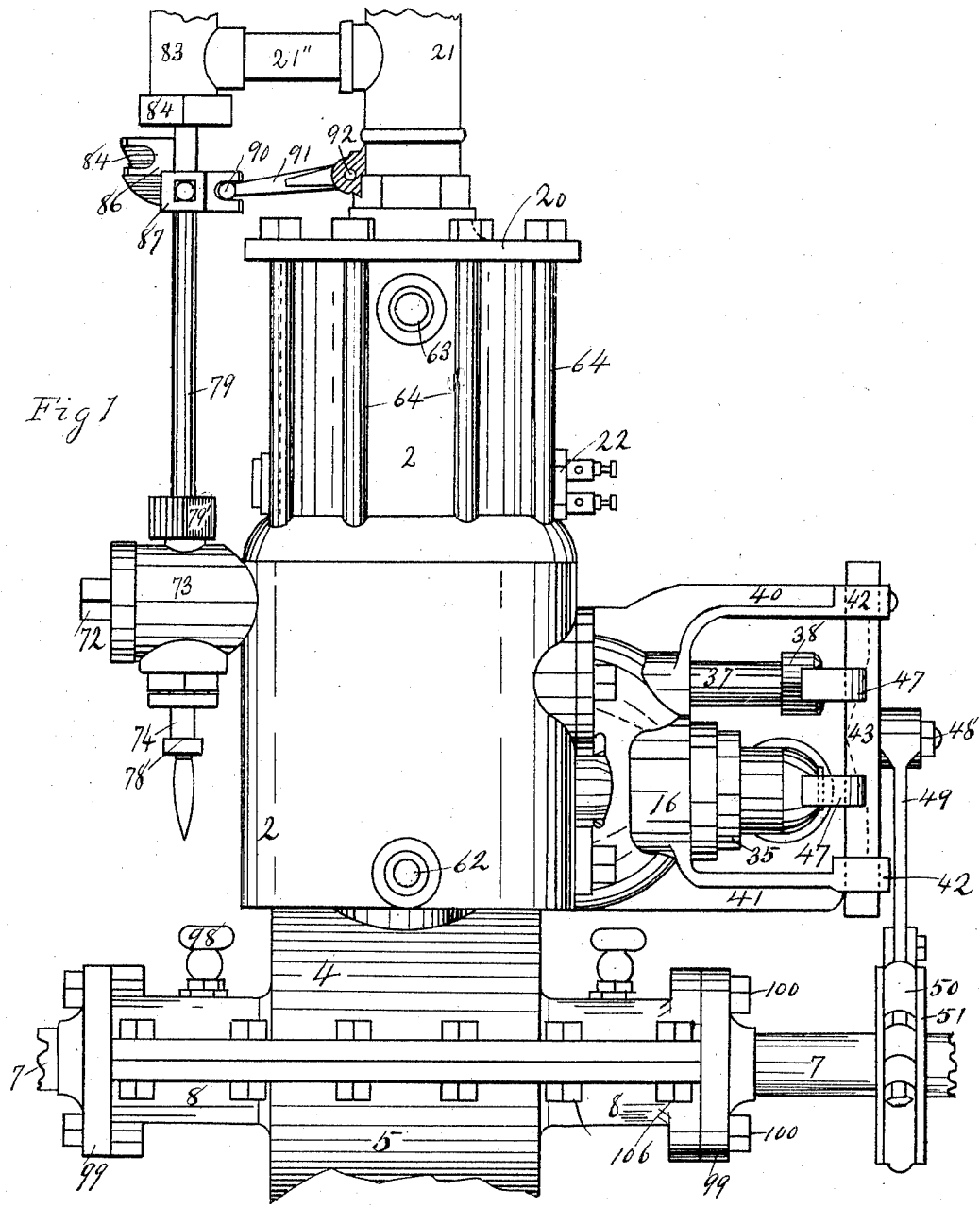

No. 780,119. PATENTED JAN. 17, 1905.
R. G. V. MYTTON.
EXPLOSIVE ENGINE.
APPLICATION FILED DEC. 13, 1900.

10 SHEETS—SHEET 1.

WITNESSES:
Anna R. McCole.
Laura Rutledge.

INVENTOR
R. G. V. MYTTON
BY
Edward P. Thompson
ATTORNEY

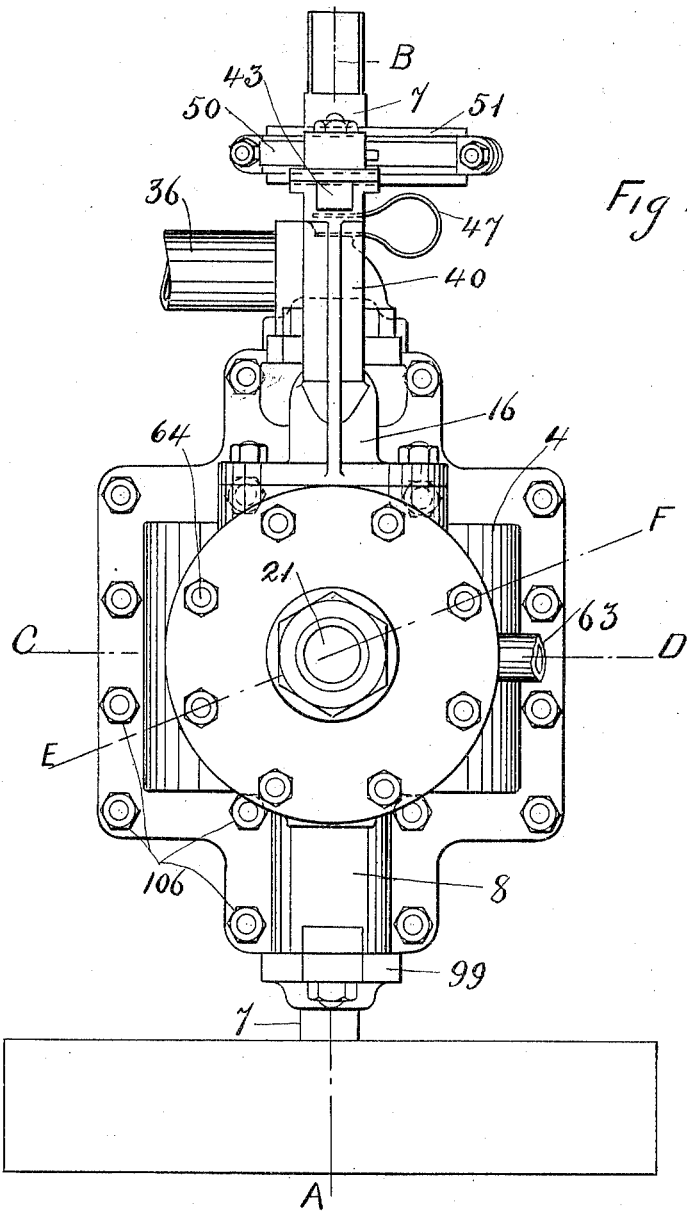

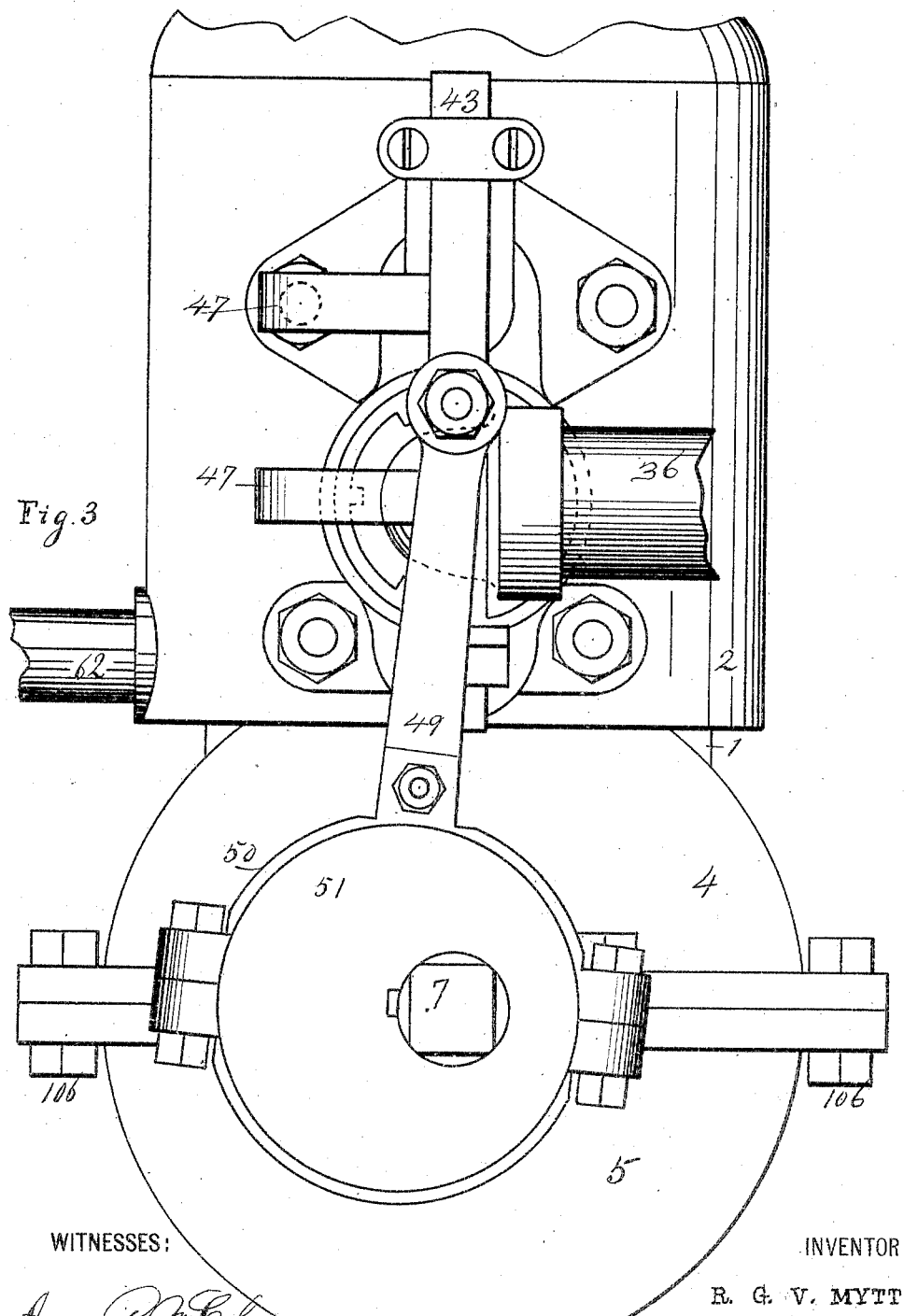

No. 780,119. PATENTED JAN. 17, 1905.
R. G. V. MYTTON.
EXPLOSIVE ENGINE.
APPLICATION FILED DEC. 13, 1900.
10 SHEETS—SHEET 4.
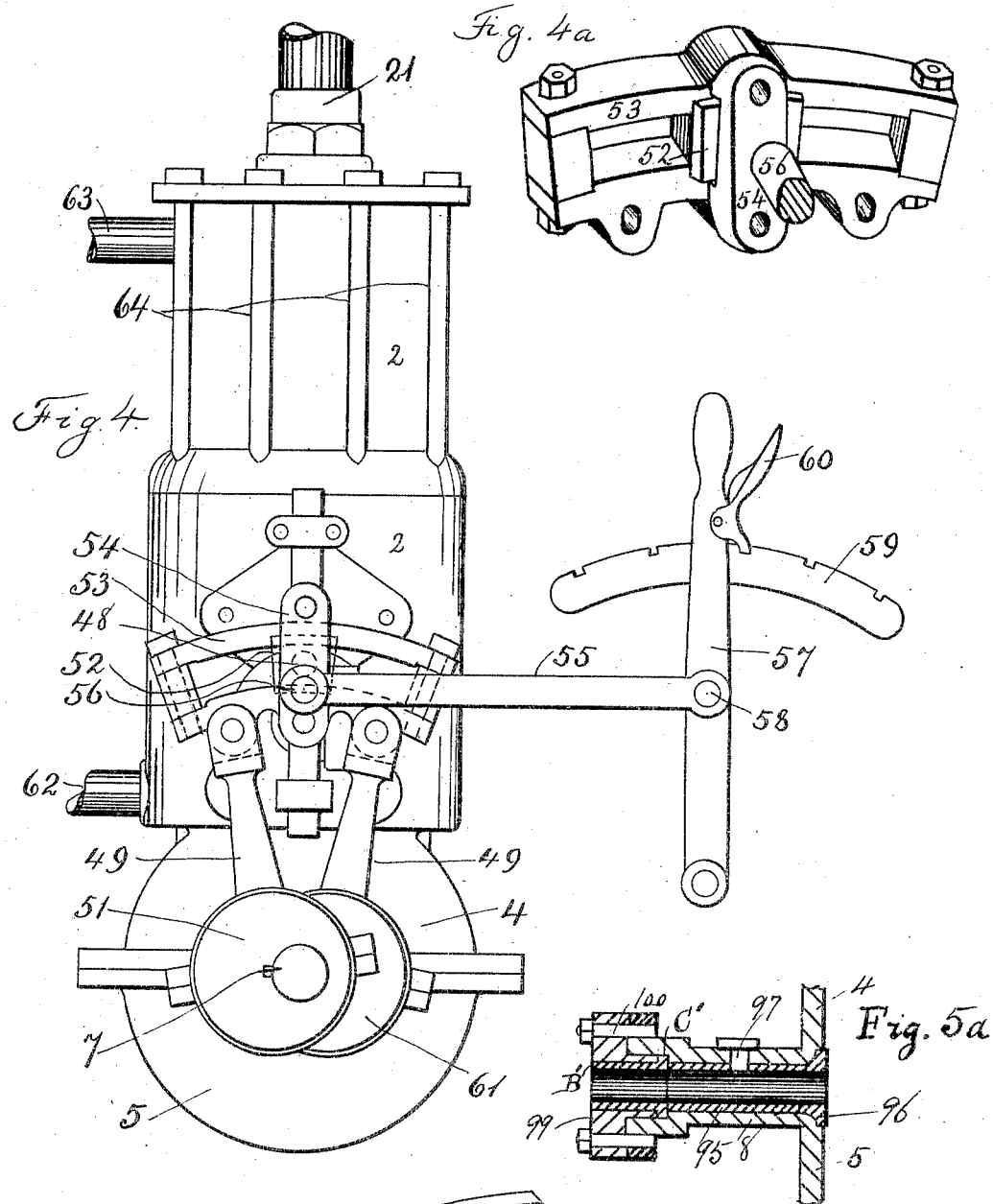
WITNESSES:
A. A. de Bonneville
Wm. P. Franck
INVENTOR
R. G. V. MYTTON
BY
Edward P. Thompson
ATTORNEY

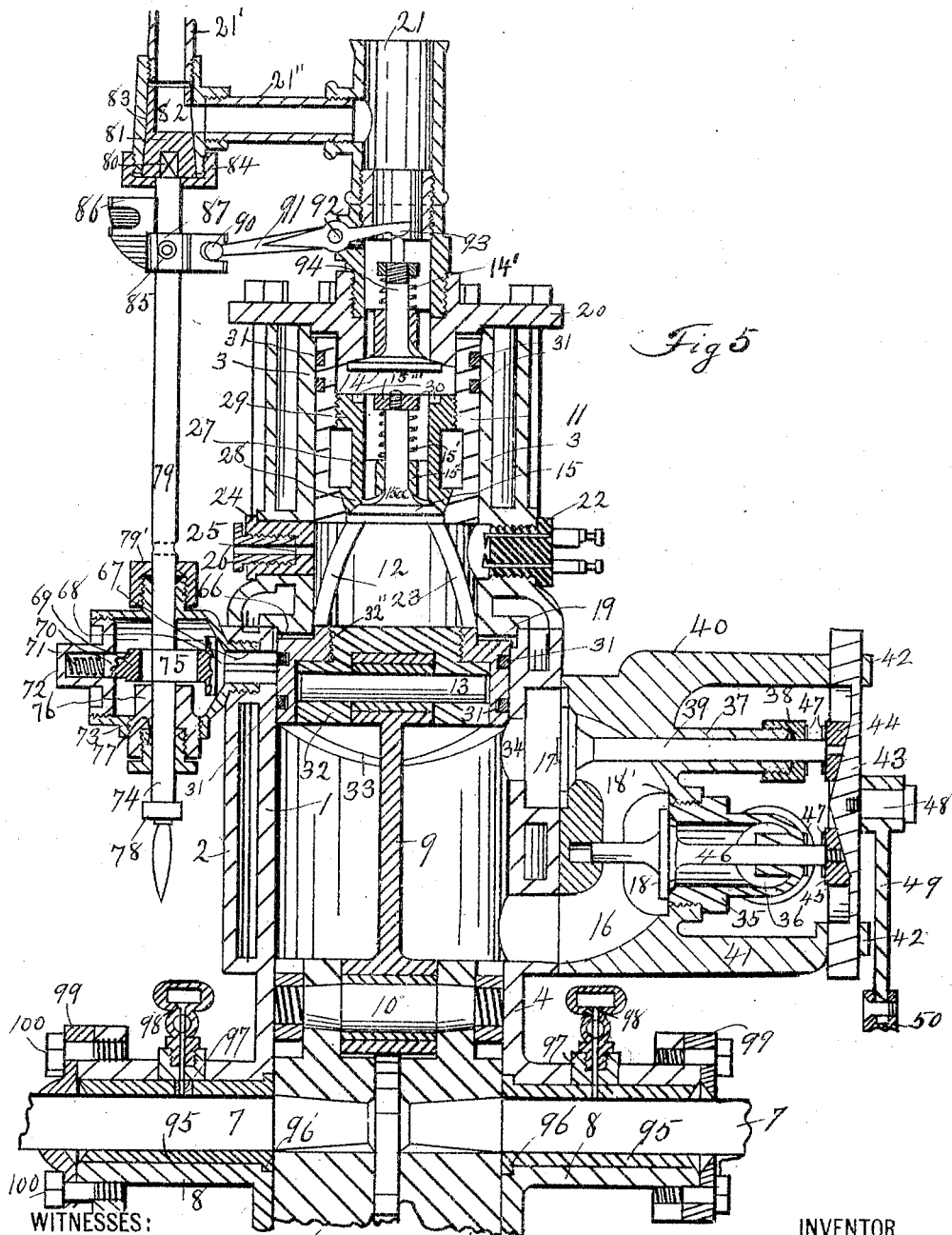

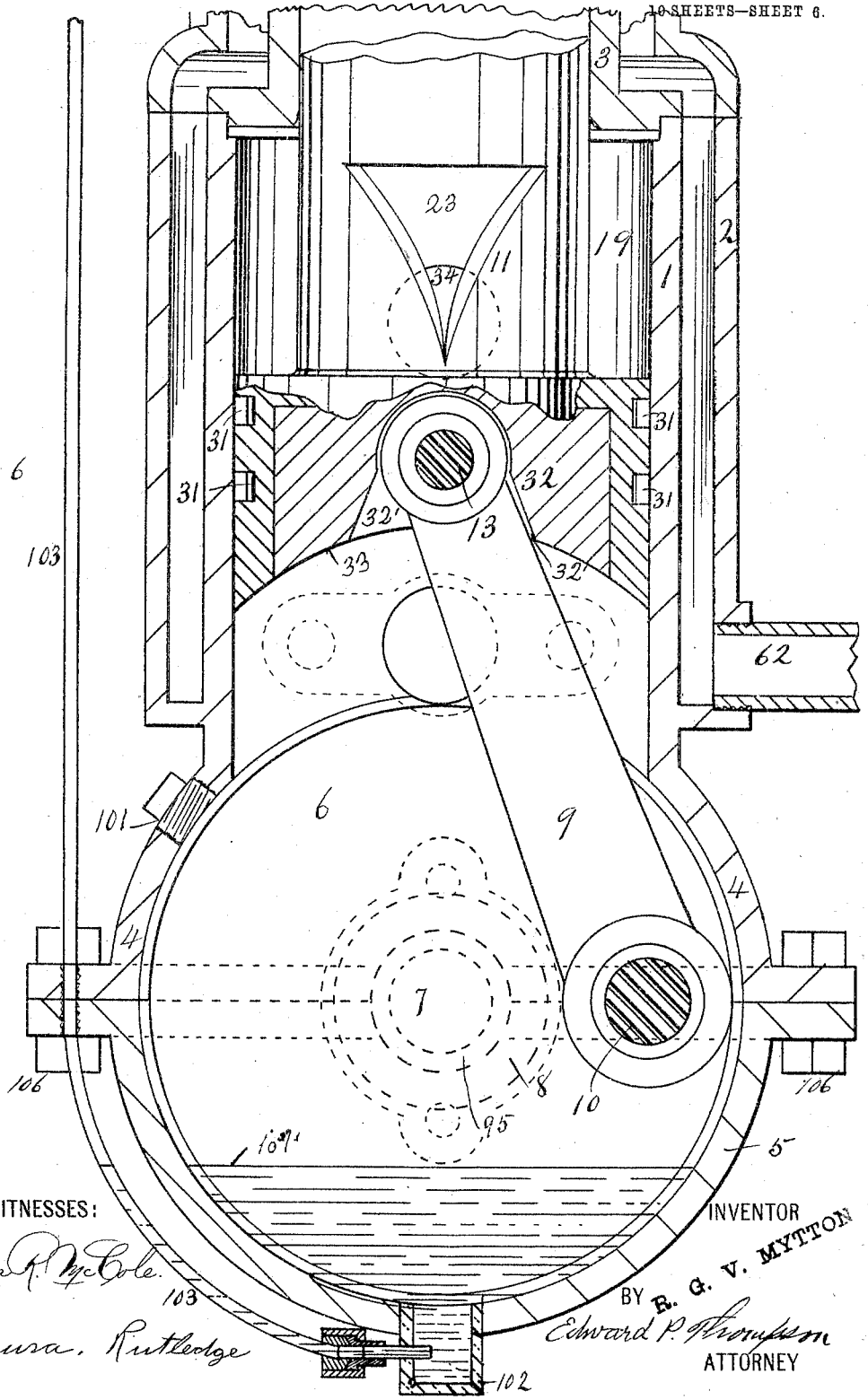

No. 780,119. PATENTED JAN. 17, 1905.
R. G. V. MYTTON.
EXPLOSIVE ENGINE.
APPLICATION FILED DEC. 13, 1900.
10 SHEETS—SHEET 7.
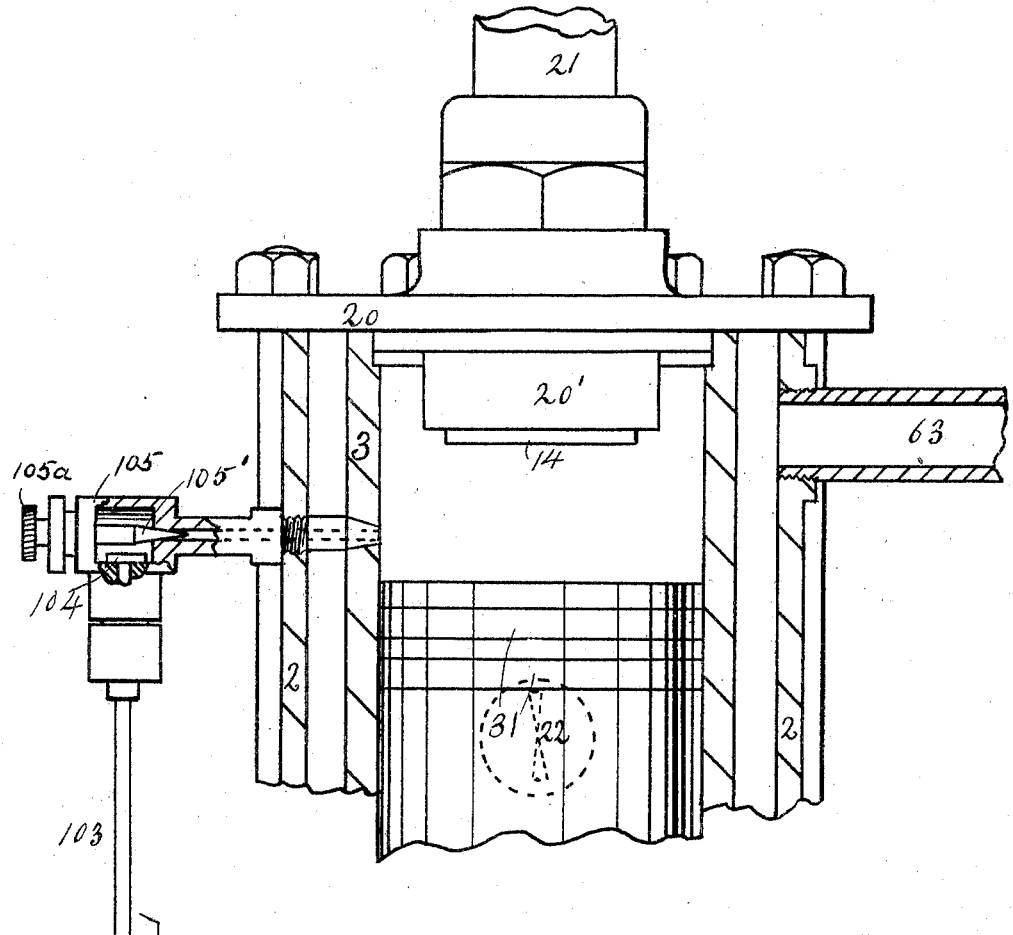
Fig. 6a
WITNESSES: 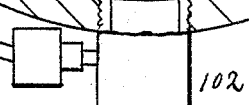
INVENTOR
R. G. V. MYTTON
BY
Edward P. Thompson
ATTORNEY No. 780,119. PATENTED JAN. 17, 1905.
R. G. V. MYTTON.
EXPLOSIVE ENGINE.
APPLICATION FILED DEC. 13, 1900.
10 SHEETS—SHEET 8.
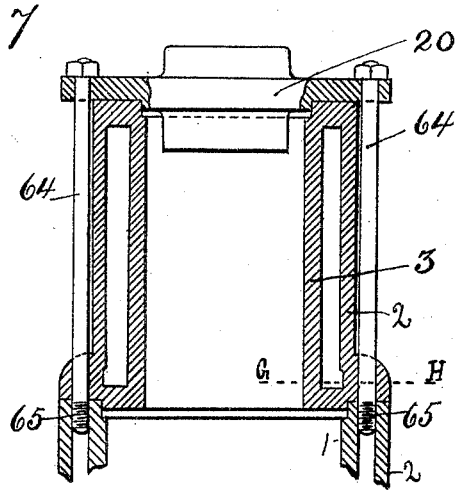
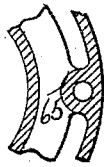
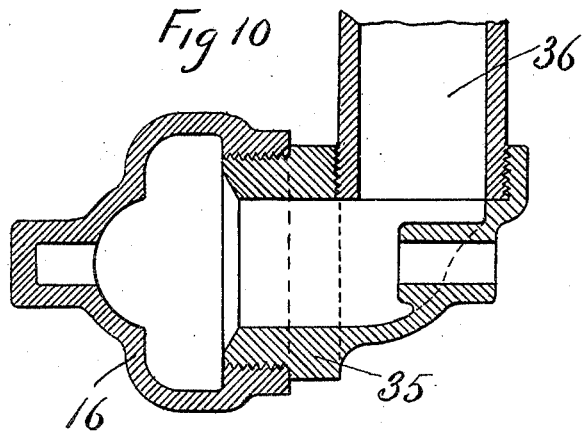
WITNESSES:
A. A. de Bonneville
Wm. P. Franel
INVENTOR
R. G. V. MYTTON
BY
Edward P. Thompson
ATTORNEY

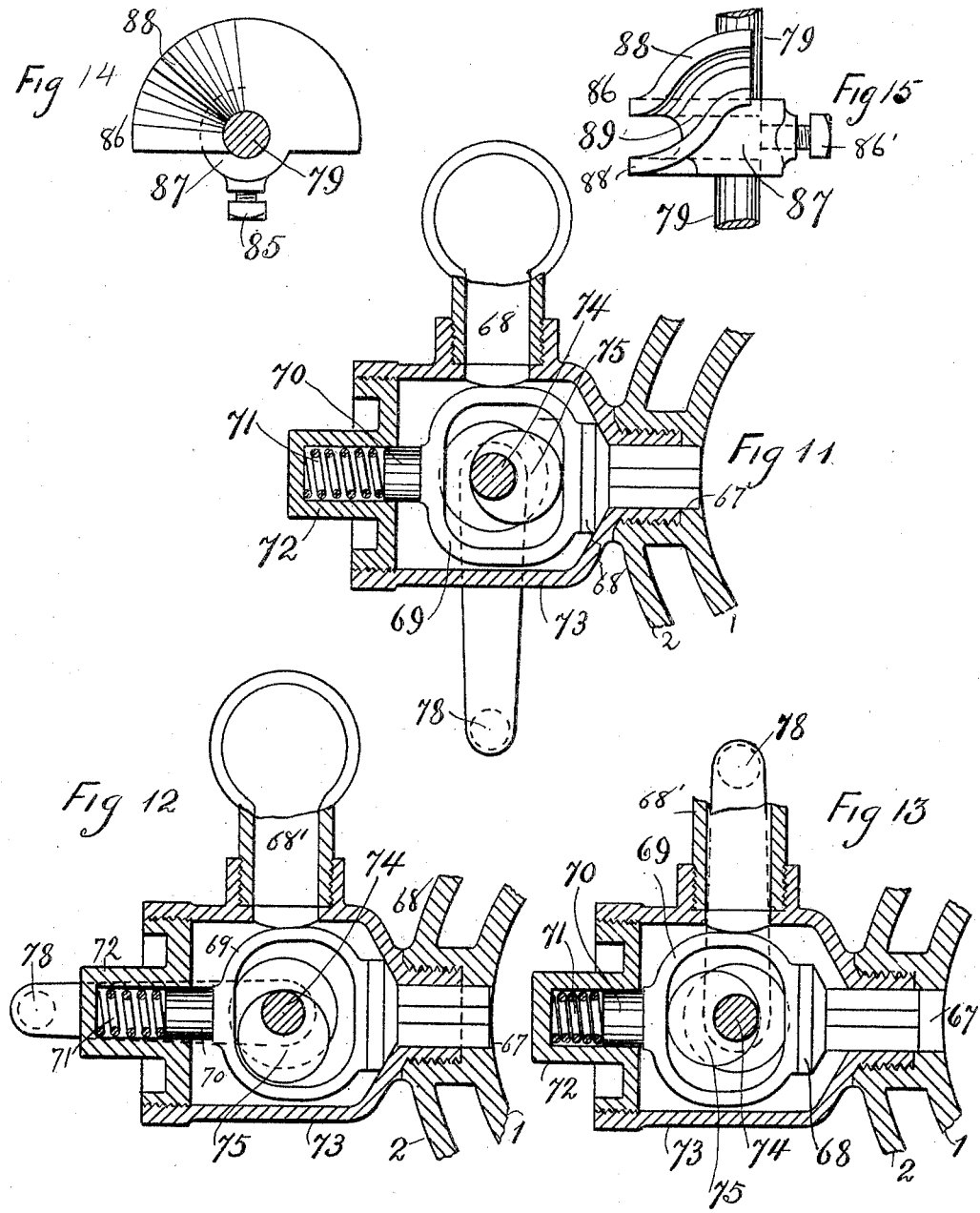

No. 780,119. PATENTED JAN. 17, 1905.
R. G. V. MYTTON.
EXPLOSIVE ENGINE.
APPLICATION FILED DEC. 13, 1900.

10 SHEETS—SHEET 10.

WITNESSES:
Anna R. McCole.
Laura Rutledge.

INVENTOR
R. G. V. MYTTON
BY Edward P. Thompson
ATTORNEY

No. 780,119. Patented January 17, 1905.

UNITED STATES PATENT OFFICE.

RICHARD G. V. MYTTON, OF MERIDIAN, MISSISSIPPI.

EXPLOSIVE-ENGINE.

SPECIFICATION forming part of Letters Patent No. 780,119, dated January 17, 1905.

Application filed December 13, 1900. Serial No. 39,785.

*To all whom it may concern:*

Be it known that I, RICHARD G. V. MYTTON, a citizen of the United States of America, and a resident of Meridian, county of Lauderdale, Mississippi, have invented certain new and useful Improvements in Explosive-Engines, of which the following is a specification.

My invention relates to a motor or engine adapted to be operated by the force of the explosion of ignitible mixtures of gases or vapors or like substances with air.

More particularly, the engine belongs to that class in which there are two cylinders of different diameters, but of equal stroke and arranged tandem fashion. In my invention the cylinder of smaller diameter is the charge inspirator and compressor, while the cylinder of larger diameter constitutes the power-cylinder. A single piston is provided for the two cylinders and has a reduced portion, by means of which piston there are two power-cylinders, the one being a high-pressure and the other a low-pressure cylinder. The former is adapted to exist between the inner walls of the larger cylinder and said reduced portion of piston. The low-pressure cylinder is between the ends of the larger cylinder and of the larger portion of the piston. The annular high-pressure cylinder is for the action of the primary expansion of the exploded gases, while the low-pressure cylinder is for the action of the secondary expansion. The larger or main cylinder is so constructed as to be provided with an extension serving as one half of a crank-chamber. The other half is a semicylindrical recess in a separate piece attachable to and detachable from the first-mentioned half, the bearings of the shaft being divided between the two halves. The end of the piston adjacent to the crank is arc-shaped to conform to the disk-crank, which practically registers with the end of the piston.

Means are provided for admitting the exploded gases to the high-pressure cylinder upon the first half of the stroke, then to the low-pressure cylinder upon the other half of the stroke, and then to the outside atmosphere during the first half of the next stroke, and so on indefinitely. Said means consist generally of valves operated by eccentrics and special intermediate devices. More particularly, a port provided with a valve extends from the high-pressure annular cylinder to the low-pressure cylinder, said valve opening toward the former. Another valve is between the atmosphere and said port and opens toward the port. Said two valves have suitable bearings and are properly operated indirectly by an eccentric. The chamber in which the gases or vapors are exploded is in the smaller part of the piston, and said chamber has triangular outlets which are so located as to be closed by the walls of the compressor when the crank is at the inner dead-center, and a little beyond for a small arc upon each side of the position of the dead-center, all for the purpose of balancing the shock of the explosion during ignition.

The invention will now be described in all its details by reference to the accompanying drawings.

Figure 17:
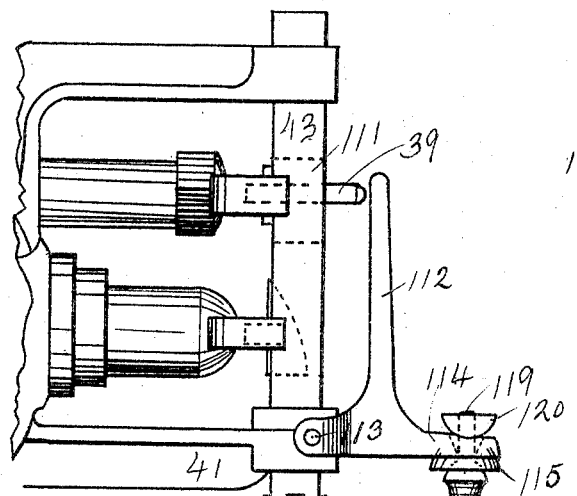
Figure 16:
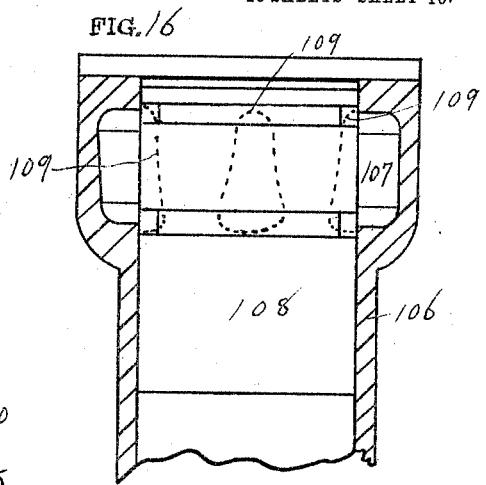
Figure 18:
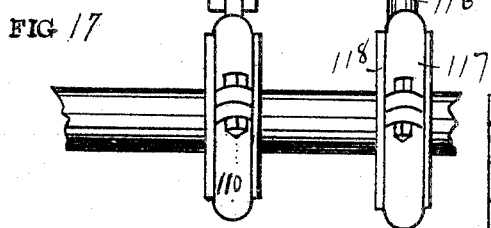
Figure 19:
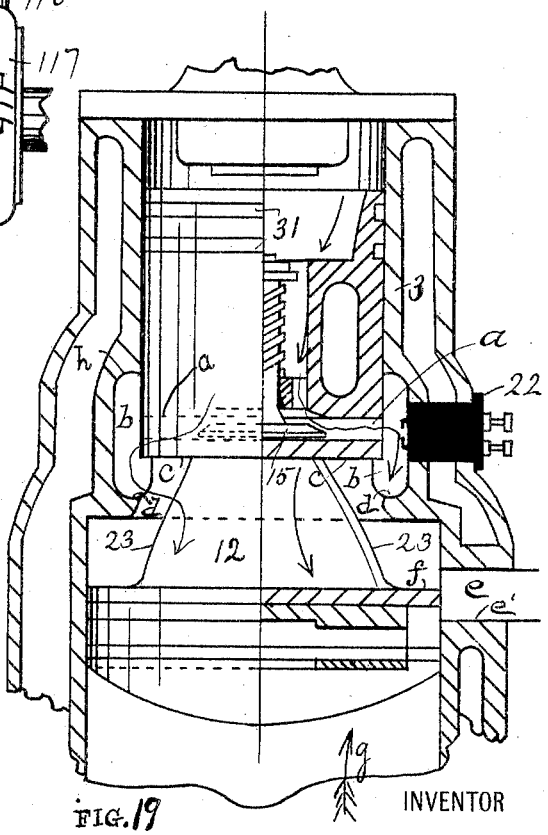

Figure 1 shows a side elevation of the engine, portions at the extremities being broken off and omitted. Fig. 2 is a plan of the same engine. The fly-wheel is also shown and one or two other parts which do not appear in Fig. 1; but the starting device is omitted. Fig. 3 is an elevation of a portion of the engine on a much larger scale, the type represented being a non-reversing engine. The side shown is the right-hand side of the engine in Fig. 1. Fig. 4 is an elevation, on a smaller scale, of the same engine equipped with a reversing-gear. Fig. 4$^a$ is a general perspective view showing principally the link-block seen in elevation in Fig. 4, the link being shown also. Fig. 4$^b$ is a general perspective sketch of the link-block by itself. Fig. 5 is a vertical central sectional elevation of the engine, taken on line A B in Fig. 2. Some of the small cylindrical parts are not shown in section. Only a portion of the eccentric is shown. The ends of the shaft are omitted. The crank and piston are shown at about a position of the inner or upper and dead center. Fig. 5$^a$ is a section, on a reduced scale, of the modified form of bearing for the shaft 7. Fig. 6 is a section in elevation, on a larger scale, of the lower portion of the engine taken on the line C D in Fig. 2. The phase of the piston is different from that represented in Fig. 5, the position being that obtained when the crank has turned about one-quarter of a revolution from the upper dead-center. Fig. 6ᵃ is a similar view to that in Fig. 6, showing the top and bottom portions, the middle portion, which is seen in Fig. 6, being omitted. The scale of Figs. 6 and 6ᵃ are about the same. Fig. 7 is a sectional elevation taken at the line E F in Fig. 2 in order to illustrate the means for attaching the pump-cylinder head to the pump-cylinder. Fig. 8 is a sectional plan through one of the bolt-holes at about the line G H in Fig. 7. Fig. 9 is a plan of a portion of the pump-cylinder directly above one of the said bolt-holes. Fig. 10 is a sectional plan of the construction around and including the final exhaust-valve seat and outlet shown in exterior view at 16 and 35 in Fig. 1 and in vertical section in Fig. 5 at 16 and 35. Figs. 11, 12, and 13 represent different phases in horizontal section of the valve-casing 73 and its contents and some of its adjuncts. Fig. 14 is a plan of the cam 86, its spindle being shown in section. Fig. 15 is an elevation of the same cam in a direction at right angles to that shown in Figs. 1 and 5. Figs. 16 is a vertical section of a modification of the explosion-chamber. Fig. 17 is an elevation of means for operating the primary and secondary exhaust-valves. It is a modification of the construction shown at the right hand, especially of Figs. 1 and 5. Fig. 18 is a modification of the bell-crank lever 112 in Fig. 17. Fig. 19 is a view, partially in vertical section and exterior, of a modified construction and arrangement of ports of admission to the high-pressure cylinder.

1 is the main cylinder, being the one of larger diameter and adapted to serve at its upper portion as a high-pressure annular cylinder and at its lower portion as a low-pressure cylinder.

2 is a water-jacket surrounding the cylinder 1.

3 is the compressor or pump-cylinder, being of smaller diameter than and communicating with the main cylinder 1 at one end thereof concentrically and opening directly thereinto.

4 and 5 are the parts of the crank-chamber cylindrically formed, with its axes intersecting the common axis of the above-named cylinders at right angles and opening directly into the main cylinder at the end opposite to the pump-cylinder. The crank-chamber is formed of two parts, the one part 4 being a metallic extension of the main cylinder and the part 5 being a cap secured thereto.

6 is a disk-crank rotary within said crank-chamber with the least possible clearance, and thereby practically filling the crank-chamber.

7 is the main shaft, upon which the crank-disks 6 are mounted and which is carried through bearings 8 on opposite sides of the crank-chamber.

9 is a connecting-rod between the crank-pin 10 on the crank-disk 6 and the piston 11 through the medium of the piston-pin 13.

12 is an explosion-chamber formed in the piston centrally, so that the larger portion of the piston separates said explosion-chamber from the low-pressure cylinder and so that the smaller portion of the piston separates said explosion-chamber from the farther end of the pump-cylinder, as will become more evident from explanations hereinafter.

14 is an admission-valve for the explosive mixture from any given reservoir to the pump-cylinder, the same opening toward the cylinder.

15 is a valve carried on the piston and serves as an admission-valve from the pump-cylinder 3 to the explosion-chamber 12, and the same opens inwardly to the explosion-chamber.

16 is a valve chamber or port passing from the low-pressure part of the main cylinder to the high-pressure part.

17 is a primary exhaust-valve located in the passage-way 16 and opening inwardly toward the high-pressure cylinder. 18 is a secondary or final exhaust-valve for the exit of the exhaust-gases to the outside atmosphere. Both of these valves 17 and 18 are adapted to be operated by an eccentric through the medium of special valve-gear hereinafter explained.

19 is a high-pressure cylinder formed around the smaller portion of the piston while located within the main cylinder. It is plainly represented in Fig. 6. This space becomes the high-pressure portion of the main cylinder, because the gases enter the same immediately after explosion and are subsequently admitted to the low-pressure chamber.

22 is a sparking plug located at the lowest side of the pump-cylinder 3, opposite the explosion-chamber 12, when at about its highest position. The communication between the sparking plug and the chamber 12 is by means of one of the equal triangular ports 23 formed in the opposite sides of the piston 11, the openings being so shaped and arranged that the smaller portion of each opening is nearest the main cylinder, so that as the piston moves more and more into the main cylinder the said openings grow gradually larger and larger. These openings serve, therefore, as ports, and the walls of the pump-cylinder serve as valves, relatively considered, for admitting the exploded gases gradually from the explosion-chamber 12 to the high-pressure cylinder 19. The passage of the gases, therefore, thus far through the engine is past the admission-valve 14 in the pump-cylinder head 20, then through the valve 15 in the piston 11, and then, after explosion, from the chamber 12 to the cylinder 19.

26 is a tubular plug located in another tubular plug 24, passing through the pump-cylinder 3 opposite the sparking plug 22.

25 is a film held in the tubular opening in said plug, the same being of mica or other transparent medium, so that the spark may be seen and adjusted.

27 is a hollow screw-plug inside the piston 11, formed with a seat on the tapered portion 28 for the admission-valve 15, the screw portion 29 of the plug 27 having recesses 30 for receiving a T-wrench. The plug 27 may therefore be easily applied and removed. The valve 15 is spring-seated, the spring being numbered 15', held between the bearing 15'' and the nut 15''', secured on the spindle 15$^a$ of the valve 15.

31 represents packing-rings on the smaller and larger portions of the piston. The larger portion of the piston 11 has a removable piston-head 32, which carries the piston-pin 13, the portion 32 having a clearance-space 32' to permit the reciprocations of the connecting-rod 9. The removable head 32 is attached to the piston by the inner threaded joint 32''.

33 represents that the larger end of the piston opposite the crank-disk 6 is curved to conform to the arc of said disk for the evident purpose of reducing the clearance at the end of the cylinder at the end of the stroke of the piston.

The cross-sectional area of the main cylinder 1 is about double that of the pump-cylinder 3.

34 is a port in the wall of the main cylinder, so located as to be opened when the high-pressure cylinder has its maximum volume, and so that it is completely closed by the piston when same is at the position of two-thirds of its return stroke. One edge of the port 34 is therefore located at one-third the distance from one end to the other of the power-cylinder 1. The valve 17 opens into the port 34 from the passage-way 16.

35 is a seat for the final exhaust-valve 18, and it is adapted to be removed, being held by the screw-joint 18'. The functions of the valve 18 are not only as an exhaust to the outside atmosphere, but also as a relief-valve (to admit air) in case the pressure falls below that of the outer air.

37 is a bearing and guide for the stem 39 of the valve 17, and it is provided with a stuffing-box 38.

40 and 41 are supports for the double wedge 43, which is located in the slotted ends 42 of the supports 40 and 41. The wedge 43 is loose in the slotted ends 42, and the parts of the wedge are in contact with movable shoes 44 and 45, which are adapted to be moved at right angles to the direction of the reciprocating motion of the wedge 44. The shoes 44 and 45 are attached, respectively, to the stem 39 of the valve 17 and to the stem 46 of the final exhaust-valve 18. The shoes 44 and 45 bear upon the sloping surfaces of the double wedge 43. Referring, for instance, to Fig. 5, an upward movement of the wedge 43 will open the valve 17 and a downward movement will open the valve 18, the wedge operating against the action of the horseshoe-springs 47, placed between the shoes 44 and 45 and the bearings for the stems 39 and 46.

48 is a pin screwed to the wedge 43.

49 is a link-blade pivoted to the pin 48 at one end and fastened rigidly to the eccentric-strap 50 at the other end.

51 is the eccentric, omitted in Fig. 5, but shown in Figs. 1, 2, 3, and 4.

In the reversing-engine shown in Fig. 4 the pin 48 is located in the link-block 52 belonging to the link 53, which has a saddle 54.

55 is a reach-rod connecting the saddle-pin 56 to the reversing-lever 57 by means of the pin 58.

60 is a latch for locking the lever 57 to the notched quadrant 59.

There are two eccentrics 51 and 61 on the shaft 7, connected to the opposite ends of the link 53 by the two link-blades 49.

62 is the inlet-pipe, and 63 the discharge-pipe, of the water-jacket 2, which is extended to surround both the main cylinder and the pump-cylinder.

64 represents studs screwed into lugs 65 in the main cylinder for the purpose of connecting the pump-cylinder 3 to the main cylinder 1 and the pump-cylinder head 20 to pump-cylinder 3. Figs. 7 and 8 show this construction.

At 67 is a port connecting the annular high-pressure cylinder to the valve-casing 73. A groove 66 connects this part with the clearance-space at the cylinder-head of the annular cylinder. In the port 67 is a valve 68, adapted to be employed either as a stop-valve, check-valve, or admission-valve. 69 is the yoke, and 70 the stem of the valve. 71 is a spring pressing against said stem 70 and oppositely against the interior end of a recessed cap 72, which contains said spring and is screwed into the side of the casing 73 opposite to and concentric with port 67. 74 is a stem carrying an eccentric-cam 75 and passing through the yoke 69, supported by a bearing 76, screwed into the casing 73 and upon which the cam 75 rests. When this plug-bearing 76 is removed, the stem 74, with the attached cam 75, may be also removed. 77 is a stuffing-box for the rod 74 and bearing 76. The cam 75 is for controlling the valve 68 through the medium of the yoke 69. These features are shown in conjunction with Fig. 5, but may be best understood by reference to the enlarged Figs. 11, 12, and 13. In Figs. 5 and 11 the valve 68 is represented as closed against the seat of the port 67 by the pressure of the cam 75. The handle 78 is provided for turning the stem 74 manually. When the handle 78 is turned through a quarter of a circle, as in Fig. 12, from the phase shown in Figs. 5 and 11, the valve becomes a check-valve, being held in a yielding manner by the spring 71, and therefore free to be opened by a sufficient pressure of gas in the high-pressure cylinder. A half-revolution of the handle from the position in Fig. 11 maintains the valve in its open position permanently, all as shown in Fig. 13, because the cam 75 presses against the left hand of the yoke and holds the spring 71 in a compressed condition and the valve 68 away from its seat.

79 is an upward extension of the stem 74, 79' being the stuffing-box, through which it passes from the casing 73. At the upper end the extension at 80 is square and fits into a recess in a rotary valve 81, whose port is 82, passing from the side of the plug-valve 81 to the upper end and communicating between the pipe 21', which leads to the gas, and the pipe 21'', which leads to the main admission-pipe 21, which in turn leads to the pump-cylinder. The valve 81 therefore manually controls the admission of the gas or vapor to the pump-cylinder. The valve 81 is so located with respect to the valve 68 and the handle 78 that said valve 68 is closed while the valve 81 is open, as clearly shown in Fig. 5. By turning the handle 78 the valve 68 may be opened for the admission of air under pressure (for starting) through the pipe 68'. The functions of these valves are more fully described hereinafter.

84 is a screw-cap upon the casing 83 for retaining and supporting the valve 81 therein.

I have provided means for manually adjusting the admission-valve 14 for the pump-cylinder. Said means consist of the grooved cam 86, having a hub portion 87 and exterior flanges 88, forming the groove 89. The set-screw 86' fastens the cam 86 to the extended stem 79. In the groove 89 is located a ball 90 on the end of a lever 91, having the pivotal support 92 and having the arm 93, opposite the ball end, bearing upon the stem 94 of the valve 14. The groove 89 is curved, so that a rotation of the handle 78 will raise and lower the end 93 relatively to the stem 94. In the phase represented in Fig. 5 the lever 91 is adjusted so that the pressure of the gas admitted through the pipe 21 will open the valve 14, while at the same time the valve 68 is held closed; but when the handle 78 is turned from pumping to starting position the cam 86 pushes the valve 14 to an open position to prevent an air resistance in the pump-cylinder while starting the engine, thus serving the purpose of the usual compression-cock.

The preferred form of bearing for the shaft 7 is represented in Fig. 5ª. 95 represents the bushings, having a flange 96 on the side of the crank-chamber. 99 represents glands held to the bearings 8 by the studs 100 and retaining also the supplemental bushings B', having the flanges C' bearing against the bushings 95 and extending around the inner end of the glands 99. 97 represents dowel-keepers to prevent the bushings 95 from turning. An oil-cup 98 is shown in Fig. 5 on each side of the engine. The bushings 95 have their flanged portions 96 extending slightly into the crank-chamber 6.

101 is a screw-plug for admitting lubricating-oil 101' into the crank-chamber. (See Figs. 6 and 6ª.)

102 is a cap to collect sediment from the oil at the bottom of the crank-chamber section 5.

103 is a pipe communicating with the cap 102 and passing upward to a casing 105, which leads to the pump-cylinder 3.

104 is a flat-faced check-valve between the tube 103 and the casing 105 and has a guide-stem projecting into pipe 103.

A manual regulating needle-valve 105', having a thumb-screw 105ª, serves to regulate the flow into the pump-cylinder and can prevent undue quantities of oil and the blowing in of burned gases. The nature of the lubrication in the crank-cylinder is a "splash about" in view of the stirring motion produced by the connecting-rod 9 and piston. The lubrication of the pump-cylinder takes place under the combined influence of the pressure in the crank-chamber and the reduction of pressure in the pump-cylinder during the suction stroke. It is evident that any unused oil will flow back to the crank-chamber ready to be used again.

My invention may be modified without departing from the spirit thereof.

In Fig. 16, 107 is the explosion-chamber, consisting of an enlargement of a main cylinder 106, belonging to any kind of gas-engine and opening either directly or through triangular ports 109 into the main cylinder. There may also be an explosion-chamber in the piston 108, having triangular openings 109, or the piston may be a plain piston, without the explosion-chamber therein. As the stroke begins the narrow ends of the ports 109 open gradually until the maximum pressure is reached in view of the openings becoming wider.

In Fig. 17 is shown modified means for controlling the two exhaust-valves 17 and 18. 111 is a slot through the wedge 43, containing an extension of the stem 39. 112 is a bell-crank in whose path the stem 39 is located. The eccentric 118 operates the bell-crank through the intermediate ball-joint at 115, eccentric-strap 117, and its connecting-rod 116, which joins the ball-joint. 113 is the pivot of the bell-crank, carried by the stationary arm 41. 112 is a hemispherical nut on the screw-stem 119, which extends upward from the ball-joint. The valve 18 is operated, substantially as in Fig. 5, by a wedge. The object of this modification is to obtain independent actions of the valves 17 and 18, so that they can be easily adjusted relatively. When means are provided for such independent operation of the two exhaust-valves 17 and 18, the port 34 is placed at instead of near the end of the high-pressure cylinder. The valve 17 being arranged to cut off communication at the right time, the piston is no longer required to perform this function. It is evident that by this means the working of the engine with compressed air is improved, but at the expense of reversibility by the means described.

The mechanism for operating the stem 39 may be further modified, as in Fig. 18. The arm 114 of the bell-crank has a practically spherical socket 122, with a similarly-shaped cap 123, inclosing a ball 121 at the end of the stem 116. Thereby the lateral motion of the bell-crank arm 114 is compensated for effectively.

By the construction shown in Fig. 19 the gases from the pump-cylinder do not enter directly into the explosion-chamber through the valve 15, as in Fig. 5, but through a port $a$, extending from the side of the piston to the valve 15. Besides there are ports $b$ in the side walls of the pump-cylinder and communicating between the ports $a$ and the explosion-chamber 12. The edge $e'$ of the primary exhaust-ports $e$ registers with the edge $f$ of the piston at the same time that the edges $c$ of the smaller parts of the piston register with the lowest part $d$ of the ports $b$. By this construction I therefore provide means for admitting the compressed charge from the pump-cylinder (without special comparative areas of the two faces of the valve 14) to the explosion-chamber at the instant the piston is passing the primary exhaust-port. The edges $c\ h$ register at about the upward limit of the piston-stroke. The sparking plug 22 is placed at one of the ports $b$. The curved arrows at the central portion of the figure indicate the path of the charge from the pump-cylinder to the explosion-chamber 12, the valve 15 being open. The portions of the charge from the opposite ends of the port $a$ in the piston meet one another in the center of the explosion-chamber. Therefore by my invention the admission-valve 15 may open directly or indirectly into the explosion-chamber.

The engine described as embodying my invention belongs to the vertical type. I will now describe the operation, considering the engine upright; but the same principle and similar operations would be found if the invention were applied to other engines.

The engine is started by means of compressed air. For this purpose the reversing-lever 57 is manipulated to one side or the other, according to the direction of rotation desired. Then the handle 78 is turned to the phase shown in Fig. 13, where the valve 68 is held open, because the cam 75 holds the yoke 69 in the proper position for opening the valve 68. Consequently air is admitted to the annular chamber by first leaking through the little groove 66 to the annular clearance at the upper portion of the large end of the piston. The turning of the handle 78 to the starting position also causes the spiral guide or cam 86 to depress the valve 14 for the purpose of preventing back pressure in the pump-cylinder. The port 67 becomes gradually more and more open as the piston descends, allowing finally the full pressure in the high-pressure cylinder. The piston then completes the outward stroke. Next in order the air will pass practically through the port 34, while the primary exhaust-valve 17 will be automatically opened to allow the pressure to be equalized per unit of area upon both sides of the piston; but in view of one side being larger the piston will upon passing the lower dead-center begin its return stroke, toward the end of which it will close the port 34. The inclosed compressed air against the larger end of the piston continuing to expand, together with the momentum of the piston, will cause the same to pass the port 67 and reach the upper dead-center, when the operation will be repeated. By reversing the engine the same may be started on the upward stroke when the piston has covered the port 34. This will cause the piston to pass by the said port. Now reverse the engine again and it will start in the original direction.

The operation as an explosive-gas engine is as follows: Assume that the piston starts downward from the upper dead-center phase. The explosive gases forming the charge enter the vacuum which tends to exist through the admission-pipe 21 and valve 14, thereby entering the pump-cylinder 3. The gas enters practically during the whole downward stroke. During the return of the piston the gas, being compressed against the now seated valve 14, is forced through the secondary admission-valve 15 directly or indirectly into the explosion-chamber 12. During this step the circulation is violent, and consequently the gases forming the explosive mixture are intimately mixed. Soon the upper dead-center is reached again, in which phase the triangular ports 23 of the explosion-chamber are closed throughout their length by the cylindrical wall of the pump-cylinder. The spark at the sparking plug 22 ignites the mixture, which explodes. The force of the explosion is resisted by the parts of the piston inclosing the explosion-chamber and the wall of the pump-cylinder, while other parts of the engine are not subjected to the sudden shock and may thus be lighter in weight than usual. The momentum of the fly-wheel carries the crank past the dead-center, and the narrower ends of the triangular ports admit the exploded gases into the annular high-pressure cylinder, thus gradually adding to the pressure until the maximum pressure is reached, because the ports 23 are wider and wider toward the top. The action is thus free from sudden shocks, and yet it is quick and prompt. In view of this construction the engine is more durable. The engine is a high-pressure engine, therefore, until the port 34 is opened and also the valve 17, the former being opened to the annular cylinder 19 by the passing of the piston and the latter being opened by the eccentric 51 and wedge 43. The expanding gases therefore pass freely to the under side of the larger end of the piston through the port 16 and for evident reasons produce the return stroke. In the meantime a new supply enters the pump-cylinder, as before, during the downstroke, and during the return stroke it is compressed. It should be noticed that the pressure area on the explosion-chamber side of the valve 15 is much larger than that on the admission side. Consequently the valve will not begin to open for receiving the compressed charge for the explosion-chamber until the pressure in the latter is greatly less than that of the new charge. As a fact substantially all the fresh charge will be delivered into the explosion-chamber while the piston is passing the port 34. The doubly-expanded charge by this time is at about atmospheric pressure. Also when the edge of the piston covers the port 34 the new charge has the volume of the pump-cylinder at atmospheric pressure and occupies the upper end of the pump-cylinder in part and also the explosion-chamber and a part of the high-pressure cylinder nearest to the explosion-chamber. Finally the whole new charge is driven into the explosion-chamber. The gases are exhausted into the outer atmosphere as follows: The principle of the action is that the larger part of the piston acts as a valve for closing the port 34, while the final exhaust-valve 18 is opened for the gases to pass from the low-pressure cylinder through the port 16, the valve 18, and the exhaust-port 36. It should be noticed that not only the residual gases in the low-pressure cylinder are thus exhausted, but also practically all of that in the high-pressure cylinder, because just before the cut-off of the port 34 by the piston the valve 15 opens very suddenly in view of the increased pressure-surface upon the upper side as soon as said valve begins to open, the same being beveled. The sudden pressure of the new charge entering ejects the gases from the high-pressure cylinder through the port 34 and into the low-pressure end. As soon as the port 34 is cut off the valve 18 is opened and the complete final exhaust takes place; but practically no part of the new charge is lost by exhaust. One-third, in the first place, is in the pump-cylinder, while there is scarcely time for it to reach the port 34 from the valve 15. The wedge mechanism 43 and shoes 45 and 44 are so constructed that the valve 17 closes when the valve 18 opens.

When the engine is used for automobiles or other vehicles and is coasting, the motor is adapted to be used for compressing air and at the same time, therefore, as a brake. For this purpose the reversing-lever is placed centrally, so that the valves 17 and 18 will not be mechanically operated. The handle 78 is then turned to the position in Fig. 12, or pumping position—that is, the valve 81 is closed and the valve 68 becomes a check-valve. Now the operation is as follows: The outside atmosphere enters the valve 18 during the upstroke of the piston, while on the downstroke the air is driven to the top of the piston through the valve 17, and thus to some extent compressed, and on the next upstroke it is again compressed in the annular cylinder. Air is also automatically drawn into the pump-cylinder through the pipe 21; but no combustible gas is drawn in, because the valve 81 is closed. Upon each upstroke the air is compressed. As a consequence all the compressed air practically is driven through the valve 68 and may be received in a reservoir. This function of the engine becomes useful also in obtaining compressed air with which to start the engine in a manner already described.

The electrical means for producing a spark are not represented, because forming no part of my invention.

Those versed in the art will recognize the advantageous features and functions of the invention. For example, it is best that the explosion should occur in a single compact space. As explained, this is arranged for in my construction. Recoil is also prevented, because the balancing of the shock is obtained, the explosion taking place at a central point and acting outwardly in all directions equally. Vibration is thus reduced to a minimum.

While the engine may be provided with a governor, yet the same has not been represented, because the engine is self-regulating. Say that the acceleration is abnormal. This will cause a part of new charge to mix with the exhaust-gases. The explosive force is therefore weakened and the speed of the engine brought back to the normal rate. It is now evident that the engine becomes very efficient by expanding the exploded gases down to atmospheric pressure with the usual amount of charge in an engine of a given size and without any increase in the length of the stroke. By means of a single piston, single connecting-rod, and single crank I accomplish the primary expansion, the secondary expansion, and the return stroke. During each explosion-stroke of the piston the gases having undergone a second expansion are discharged noiselessly through the final exhaust-valve 18 out of the exhaust-pipe 36.

Referring again to the reciprocating wedge 43, it will be noted that one exhaust-valve is always left properly seated while the other is being opened. The valve-gear may be set "line and line," so as to just open and close the final exhaust-valve 18 during the outward stroke and the valve 14 during the return stroke, or any desired amount of "lead" may be given.

Fitted with simple reversing-gear, such as a shifting or a slotted eccentric or with link-motion, the engine is readily reversed, and the speed may be governed within limits by partially throttling the exaust-valve, the engine stopped, started, or reversed in the same manner as a steam-engine.

Frequent attempts have been made to produce double-acting explosive-engines; but failures have resulted from the difficulty of keeping the usual glands and packings tight. In the herein-described engine the fact that the charge is expanded to the usual limit in the high-pressure cylinder before coming in contact with any main stuffing-box there is not the great heat to contend with common in engines of these other forms and tending to destroy the packing contained in the stuffing-boxes with which they are provided. In the present case also the destruction of the packing is further obviated, as it is not subjected to the reciprocating action of the usual piston-rod.

Heretofore oil-engines with tandem cylinders have been proposed; but as far as I remember the smaller cylinder was the power-cylinder, and a central portion was employed as an air-compressor for pumping and storing air in a reservoir to be used for braking and starting the engine. I do not claim any such construction. I am aware also of an engine having connecting-cylinders of different diameters for gaining a high degree of compression by drawing a charge into the crank-casing chamber, then compressing it therein, then delivering it through a check-valve into the annular cylinder between the two pistons, and finally with further compression passing it through another check-valve to the explosion-chamber at the end of the smaller cylinder. Another engine has tandem cylinders. The upper cylinder and the annular chamber are both arranged to be operated as power-cylinders, and an arrangement of cams enables explosions in either portion to be missed when required, whereby the speed of the engine is governed and the power of the engine increased or reduced to suit varying requirements.

I claim—

1. An explosive-engine, consisting of the combination of an inspirator and compressor, a power-cylinder communicating therewith, a piston of two diameters for the respective cylinders, an explosion-chamber formed in the piston, and means for conducting the charge immediately after explosion, to one side of the larger piston in the larger cylinder, then into the remaining portion of the larger cylinder on the other side of the larger piston, and finally to the outside atmosphere.

2. An explosive-engine, consisting of the combination of a cylinder of a given diameter, for receiving and compressing the charge before explosion, a cylinder of larger diameter for the expansion of the charge after explosion, the cylinders being arranged tandem fashion, pistons for the respective cylinders of equal stroke and connected rigidly together, the annular chamber between the inner walls of the larger cylinder and the smaller portion of the piston, being adapted to receive the charge after the explosion, but before entering the remaining portion of the larger cylinder, a crank-chamber formed by an extension of the larger cylinder and by a separate portion, attached thereto, and shaft-bearings formed in the sides of said crank-chamber.

3. In an engine, the combination of a power-cylinder, a crank-chamber formed by an extension of said cylinder, and by a separate hollow piece, shaft-bearings located in opposite sides of the crank-chamber, between the two portions thereof, a disk-crank practically filling said crank-chamber, a piston in the cylinder, having an arc-shaped end conforming to the curvature of said disk-crank, and means for admitting a fluid for driving said piston, and a connecting-rod between said piston and said crank.

4. In an explosive-engine, the combination of a cylinder, a piston fitting therein, and having a reduced portion, a second cylinder in which said reduced portion fits, there being thereby an annular chamber formed on one side of the piston around the reduced portion, and a cylindrical chamber on the other side, a primary exhaust port and valve so located as to be adapted to open into the cylindrical chamber, upon every return stroke, and to be cut off at a predetermined position of the piston, and a secondary exhaust port and valve adapted to open into the cylindrical chamber, and connecting with said primary exhaust-port, a shaft and a crank for operating said piston, an eccentric or eccentrics upon said shaft, a device controlled by said eccentric, for opening and closing said valve, ports being provided for the admission of fluid-pressure to said annular chamber.

5. In an engine, the combination of a given cylinder, a piston therein, having a reduced portion, whereby an annular chamber is formed between the reduced portion and the wall of the cylinder, a cylindrical chamber on the opposite side of the piston from the annular chamber, a port provided to open into the annular chamber and to be cut off by said piston at two-thirds of its return stroke, and containing a valve adapted to open upon every return stroke into the cylindrical chamber, a final exhaust-valve connecting with the last-named port and adapted to open during the first half of the stroke, means for admitting fluid-pressure to said annular chamber, and a device controlled mechanically by said engine for regulating the movements of said valves.

6. In an explosive-engine, a cylinder with its piston therein, said piston being provided with an explosion-chamber limited at the top and bottom by the parts of said piston, and at the sides by the walls of said cylinder, means for admitting the explosive charge into the said chamber and for preventing its return, a device for starting the engine, and an arrangement for conducting and permitting the charge, after explosion, to propel said piston, a device being provided for igniting said charge.

7. In an explosive-engine, the combination therewith of an explosion-chamber so contained within the piston of said engine that its top and bottom are formed by the parts of the piston and the sides partially by the walls of the cylinder of said engine and partially by the sides of the piston, said chamber being airtight at the point of explosion of the gases.

8. In an explosive-engine, the combination of cylinders and pistons respectively of different diameters, and arranged tandem fashion, an explosion-chamber within the smaller piston, ports for said chamber, tapering to a narrower and narrower width in a direction toward the larger cylinder, and opening to the walls of said cylinders, said chamber being adapted to be closed from the larger cylinder while completely located within the smaller cylinder, and to be open more and more through said ports into the larger cylinder, during the first portion of the stroke of the piston, the opening being effected by the movement of the smaller piston into the larger cylinder.

9. In an engine, the combination of a cylinder, a piston therein, a crank-chamber forming an extension of said cylinder, a disk-crank therein, the piston being curved on one end to match the curvature of said crank, a connecting-rod joining said crank to a pin on said piston, and a removable portion carried on said piston and supporting the connecting-rod pin.

10. In an explosive-engine, the combination of a cylinder, a diametrically-divided and exteriorly-flanged crank member, one half of which is an extension of said cylinder, a rotary disk-crank in said chamber, bearings for the journals of said crank, located in opposite walls of said chamber, stuffing-boxes therefor, flanged bushings in said bearings, said flanges fitting into counterbores upon the sides of said crank-chamber adjacent to the crank-disks, dowels for retaining the bushings from rotation, a connecting-rod joining said disk to said piston, and means for reciprocating said piston.

11. An explosive-engine, consisting of the combination of a cylinder of a given diameter for receiving and compressing the charge before explosion, a piston therein containing an explosion-chamber, with ports opening to the wall of said cylinder, a valve opening into the explosion-chamber from said cylinder, an admission port and valve opening into said cylinder for receiving the explosive charge, an enlarged extension to said cylinder forming the main cylinder, a piston therein attached rigidly to the first-named smaller piston, openings forming ports between the explosion-chamber and the cylinder in which said explosion-chamber may be located, a valve-chamber containing primary and secondary exhaust-valves opening into said main cylinder and to the outside atmosphere respectively, means for controlling said valves, said primary exhaust-valve communicating with the annular chamber between the wall of the larger cylinder and the reduced portion of said piston, and the secondary exhaust-valve communicating with the end of the large cylinder farthest from the small cylinder.

12. In an explosive-engine, the combination of a cylinder of given diameter forming the charging or pump cylinder, and having an inlet-port which is provided with an admission-valve for the charge, opening into said cylinder, a main or power cylinder of larger diameter arranged tandem fashion with the smaller cylinder, a smaller and larger piston for the respective cylinders, an explosion-chamber in the smaller piston, a valve in said chamber communicating with the smaller cylinder, said explosion-chamber having triangular ports whose sides taper toward the larger cylinder, a valve-chamber at the larger cylinder having a passage-way from one end of the large cylinder to about the other end at a predetermined point, a primary, and a final, exhaust-valve in said valve-chamber, said valves being controlled by valve-gear, a crank-chamber communicating with said larger cylinder, and a connecting-rod between said piston and the crank which is in said crank-chamber.

13. In an explosive-engine, the combination of a cylinder, a piston therein, means for producing primary expansion on one side of the piston and secondary expansion on the other side, a port for the high-pressure cylinder, a valve in said port, and means adapted to permit said valve to be opened by the pressure in said cylinder, or to hold it permanently closed against all pressures, or to be held opened for fluid to enter said high-pressure cylinder.

14. In an explosive-engine, the combination of a cylinder having a high and low pressure portion, a valve-casing with a port opening into the high-pressure portion, a valve for said port, a yoke attached to said valve, a stem with a handle for turning said cam, a spring acting upon said yoke, an outer opening for the casing leading to any desired place, one phase of the cam being to hold the valve closed for all pressures, a second phase being to leave the valve under the free action of fluid-pressure and said spring, and the other phase being to hold the valve open against the action of said spring.

15. In an engine, the combination of a cylinder having a high-pressure portion and a piston therein, a casing communicating with the high-pressure portion and with an air-reservoir, a valve in a port which communicates between the casing and the cylinder, and means for adjusting said valve to become a check-valve, a stop-valve, or a starting-valve.

16. In an engine having a high and low pressure cylinder portion, the combination with a port from the high-pressure portion, a casing detachably fastened to said cylinder at said port, stuffing-boxes on opposite sides of said casing, a valve in said port, a yoke attached thereto, a cam for operating said yoke, and a stem attached to said cam and passing through said stuffing-boxes, a reservoir communicating with said casing, a cap on the casing for receiving the stem of the yoke, a spring acting against the same, and a handle upon said stem.

17. In an explosion-engine, the combination of a pump-cylinder and a power-cylinder, a primary admission-valve in the pump-cylinder, a pipe for admitting air leading to said pump-cylinder, a lever for opening the said valve, a cam for operating the lever, a stem for the cam provided with a handle, a second valve for the power-cylinder and a second cam on said stem for controlling the phase of the second-mentioned valve, the said stem also controlling a valve which is located in the pipe for conveying a combustible fluid, or liquid, to said air-pipe which leads to said admission-valve.

18. In an explosive-engine, the combination of a compressor, a pipe for admitting air to the compressor, a pipe leading to the said air-pipe for conducting fluid thereto, a valve in the gas-pipe, a valve for conducting both the air and the fluid into the compressor, and a valve for the power-cylinder of the engine, and means controlled by a single handle for adjusting said valve to predetermined positions.

19. In an explosive-engine, the combination of a fluid-valve in a pipe leading to the air-pipe, a cylinder communicating with said air-pipe, said valve having an opening from its side to its end, a stem connected to said valve, a casing for the valve, a cap screwed to said casing for supporting and adjusting said valve, a spiral cam held upon said stem being formed with a spiral groove, a lever having a ball end located in said groove and having its other end located in said air-pipe, an admission-valve from said air-pipe to the compressor adapted to be held open by the action of said cam upon said lever, a cylinder larger than the compressor serving as the power-cylinder, and having a piston adapted to be operated by the charge after explosion, said power-cylinder having a port and a valve therefor, a yoke attached to said valve, a cam on said stem for controlling said yoke, a handle upon said stem, and a spring for resisting the action of said yoke and valve, a casing forming a valve-chamber for the last-named valve, and a reservoir communicating with said casing.

20. In an explosive-engine, the combination of a fluid-admission valve, a charge-admission valve, both for the compression and explosion chambers of the engine, and a combined starting and outlet valve for the power-cylinder, and a manual device for placing the said valve in predetermined and relative phases.

21. In an engine, the combination of a cylinder, a crank-chamber communicating therewith, a disk-crank filling said crank-chamber except for proper clearance; a piston in said cylinder, having an arc-shaped face at the end nearest said crank, and a removable portion attached to said piston; a pin carried by said removable portion, a crank-pin on said crank, and a connecting-rod journaled upon said pins.

22. In an engine, the combination of a cylinder, having a port on one side, a valve-casing communicating with said port, the cylinder having a groove leading from said port to the clearance-space at the end of said cylinder, a valve in said port, and a piston in said cylinder.

23. In an engine, the combination of a cylinder having a port therein, a valve-casing communicating with said port, a valve for the port, a yoke rigidly connected to said valve, a stem 70 for the yoke, a cap 72 detachably screwed into said casing, a spring in said cap, between the end thereof and the end of said stem, a rod 74 having a handle, stuffing-boxes screwed into the casing on opposite sides thereof, through which passes said rod, there being a predetermined amount of play allowed between the cam and the interior of the yoke where said cam is located, in such a manner and of such dimensions and proportions that by turning said handle, the valve may be held closed against all pressures, or open against the action of said spring, or free to be opened by fluid-pressure against the resiliency of said spring, and a reservoir communicating with said casing.

24. In an explosive-engine, the combination of a pump-cylinder and power-cylinder, an air-admission valve for the pump-cylinder, a gas-admission valve for the air-pipe, a valve for the power-cylinder, and means, controlled manually by a single handle, adapted to open the gas-valve when the power-cylinder valve is held closed, and when the air-valve is free, and to hold open the air-valve, when the power-cylinder valve is held open, and the gas-valve closed; and to hold the gas-valve closed when the power-cylinder valve is a check-valve, and the air-valve is free.

25. In an explosive-engine, the combination of a pump-cylinder, an air-pipe leading thereto and having a valve 14, a fluid-pipe having a valve 81, and leading to said air-pipe, a power-cylinder communicating with said pump-cylinder, a reservoir communicating with said power-cylinder through a valve 68, and means for mechanically adjusting said valve to predetermined positions, said means consisting of a rod having a handle, and fitted to the valve 81, a lever for acting upon the valve 14, a cam for controlling said lever and carried by said rod, a yoke attached to the valve 68, and a second cam upon said rod for adjusting said yoke.

26. In an engine, the combination of a piston of one diameter, a piston of a smaller diameter which is hollow to form an explosion-chamber, having openings on opposite sides, a valve closing a port, which leads from said chamber to the end of the smaller piston, a cylinder for the smaller piston, and a cylinder for the larger piston opening into the first cylinder, said openings being so located that the gases therein may exit into the larger cylinder gradually more and more, while the smaller piston is entering the larger cylinder, and other ports and valves in the said cylinders, and means for opening and closing all of said valves, for the reciprocation of the pistons, a shaft, and a connecting-rod between said shaft and said piston.

27. In an engine, a piston provided with a chamber having equal and oppositely-located triangular ports.

28. In an engine, the combination of cylinders of two diameters arranged tandem fashion, pistons of corresponding diameters located therein, one of the pistons having an explosion-chamber, provided with triangular ports whose apices point toward the larger cylinder, and therefore allow larger and larger openings to the latter when the smaller piston moves into the larger cylinder.

29. In an engine, the combination of a pressure-cylinder, a piston of two diameters, an explosion-chamber in the smaller portion, and having ports in the walls thereof for releasing the exploded gases to the pressure-cylinder, and an air-chamber in the piston between the explosion-chamber and the inspiring end of the pressure-cylinder.

30. In an engine, the combination of a pressure-cylinder, a piston of two diameters, an explosion-chamber in the smaller portion, and having ports in the walls thereof for releasing the exploded gases to the pressure-cylinder, said piston acting as the valve for said ports, and an air-chamber in said piston between said explosion-chamber and the inspiring end of said pressure-cylinder.

31. In an engine, the combination of an explosion-chamber, a main cylinder, an extension of smaller diameter, into which a charge of mixed gases is drawn and in which it is compressed, a piston fitting said cylinder and extension and containing said explosion-chamber; equal and opposite ports in the walls of said piston, adapted to be covered by the walls of said extension when the piston is at the limit of the compression-stroke; a cylinder, an inwardly-opening admission-valve in the end of said extension, and a valve in said piston opening into said explosion-chamber.

32. In an engine, the combination of a piston consisting of two portions, a main cylinder containing one portion of said piston a pump-cylinder; an explosion-chamber in one portion of said piston; a valve opening into the explosion-chamber and communicating through a port to one end of said piston; said valve having a removable seat provided in the piston, and a removable portion containing the connecting-rod pin in the opposite larger end of said piston.

33. In an engine, the combination of a cylinder and piston therein, forming separate chambers of different volumes, means for admitting the expanding gases to the smaller of said chambers during the primary expansion; a port in the side wall of said smaller chamber, a valve for said port and communicating with the larger chamber through a continuation of said port, and a second valve exterior to the first, communicating with said continuation of port in the same side wall, and through another port with the atmosphere; and means for controlling said valves.

34. In an engine the combination of a crank, an explosion-chamber, a piston containing said explosion-chamber and closed upon all sides by the walls of said chamber, when the crank is at the inner dead-center, and approximately closed, for a few degrees upon either side of the inner dead-center, for balancing the shock of the explosion at the time of ignition.

35. In an engine, the combination of a cylinder, a divided and flanged crank-chamber, a piston in said cylinder, one part of the chamber being integral with said cylinder, a cylindrical recess being formed by the inner walls of said crank-chamber and by the face of said piston adjacent thereto at the limit of its stroke; a disk-crank adapted to rotate in said recess, and journaled in bearings in opposite walls of said crank-chamber and axial thereto, and a connecting-rod pivotally connected at one end to the crank-pin and at the opposite end to a pin carried by said piston.

36. In an engine, the combination of a main cylinder, a tandem extension thereto, an admission-valve for said extension, a piston having a curved face, fitting said cylinder and said tandem extension an explosion-chamber, in said piston, a valve opening thereinto; a valve-chamber an exhaust-pipe therefor, primary and secondary exhaust-valves opening into the main cylinder and final exhaust-pipe respectively; and means for actuating said valves; a diametrically-divided crank-chamber, a disk-crank therein, a shaft carrying said crank, and journaled in bearings in said crank-chamber, and a connecting-rod joining said crank to said piston.

37. In an engine, the combination of a main cylinder a tandem extension thereto, an admission-valve for said extension, a piston having a curved face, fitting said cylinder and said tandem extension an explosion-chamber in said piston, a valve opening thereinto; a valve-chamber, an exhaust-pipe therefor, primary and secondary exhaust-valves opening into the main cylinder and final exhaust-pipe respectively; and means for actuating said valves; a diametrically-divided crank-chamber, a disk-crank therein, a shaft carrying said crank, and journaled in bearings in said crank-chamber, and a connecting-rod joining said crank to said piston, a valve-casing for one of said valves U shape therefor, said valve for primary exhaust communicating with one leg of said passage, a hollow cylindrical guideway for the stem of said valve a stuffing-box through which the stem of said valve passes; a final exhaust-port near the center of said U-shaped passage, a secondary exhaust-valve communicating therewith and with the other leg of said passage, said casing being further provided with a detachable seat for said secondary exhaust-valve and having inner and outer guideways for the axial stem of said valve upon opposite sides thereof, and slotted guide-arms for the valve-operating device.

38. In an engine, the combination of a power-cylinder, an annular primary expansion-chamber, a cylindrical secondary expansion-chamber, a piston forming the chambers in said cylinder, a valve-casing provided with a U-shaped passage connecting said chambers and with a primary exhaust-valve adjacent to its point of junction with said annular chamber, a final exhaust-valve communicating through said U-shaped passage with the secondary expansion-chamber, and a final exhaust-port in said valve-casing; both of said valves being held normally closed, and means for opening the same at a predetermined time.

39. An explosive-engine, consisting of the combination of a cylinder of a given diameter for receiving and compressing the charge before explosion, a cylinder of larger diameter for expansion of the charge after explosion, the cylinders being arranged tandem fashion, and of equal stroke, pistons for the respective cylinders connected rigidly together, and an explosion-chamber carried by said piston, the walls of the smaller cylinder forming the valve between the two cylinders, and an air-chamber in the piston between the explosion-chamber and the inspiring end of the pump-cylinder.

40. An explosive-engine, consisting of the combination of a cylinder of a given diameter for receiving and compressing the charge before explosion, a cylinder of larger diameter for expansion of the charge after explosion, the cylinders being arranged tandem fashion, and pistons of equal stroke, for the respective cylinders, connected rigidly together, the annular chamber formed between the inner walls of the larger cylinder and the smaller portion of the piston, being adapted to receive the charge after explosion, but before entering the remaining portion of the larger cylinder, valves and ports being provided for the passage of the charge, and an explosion-chamber carried by said piston.

41. In an engine, the combination of a main cylinder, oppositely extended to form one half of a crank-chamber, an exterior cylinder concentric to and opening into the main cylinder at one end, a separate piece containing a semicylindrical recess, forming the other half of, and attachable to, the said former half of said crank-chamber; bearings provided therein axially to the said cylindrical recess, and diametrically divided between the halves of the aforesaid crank-chamber, and a crank in said chamber.

42. In an engine, the combination of a cylinder and piston jointly forming a primary expansion-chamber, and a secondary expansion-chamber; an explosion-chamber, and means for admitting the products of the explosion of the charge to the said primary chamber upon about the first half of the stroke, then to the cylindrical chamber upon about the latter half of the stroke, and then to the outside atmosphere during about the first half of the next stroke.

43. In an engine, the combination of a main cylinder, a pump-cylinder concentrically mounted upon, and opening into said main cylinder, a crank-chamber, an extension of the latter forming one half said crank-chamber; an opposite attached half of said crank-chamber fastened to the said first half, a piston of two diameters fitting the respective cylinders, and having its face adjacent to said crank-chamber arc-shaped in such manner that when the piston is at the end of its stroke adjacent to said crank-chamber, it forms with the interior of the portion of same integral with the cylinder, a semicylindrical recess, the similar recess in attached half of said crank-chamber diametrically registering with the first recess; a disk-crank in the cylindrical recess so formed, and a crank-shaft for carrying said disk-crank.

44. In an engine, the combination of a crank-chamber, a cylinder and piston jointly forming in succession, an annular expansion-chamber at a reduced portion of said piston, and a cylindrical expansion-chamber of greater area and volume, adjacent to the larger face of said piston, an exhaust-port provided upon the side of the larger cylinder and adjacent to said crank-chamber, a primary exhaust-port on the side of said cylinder, opening into said annular chamber, and adapted to be closed by said piston during the latter part of the compression-stroke.

In testimony whereof I have hereunto subscribed my name this 30th day of November, 1900.

RICHD. G. V. MYTTON. [L. S.]

Witnesses:
B. F. STOLLENWERCK,
E. G. CARTER.